UNITED STATES PATENT OFFICE.

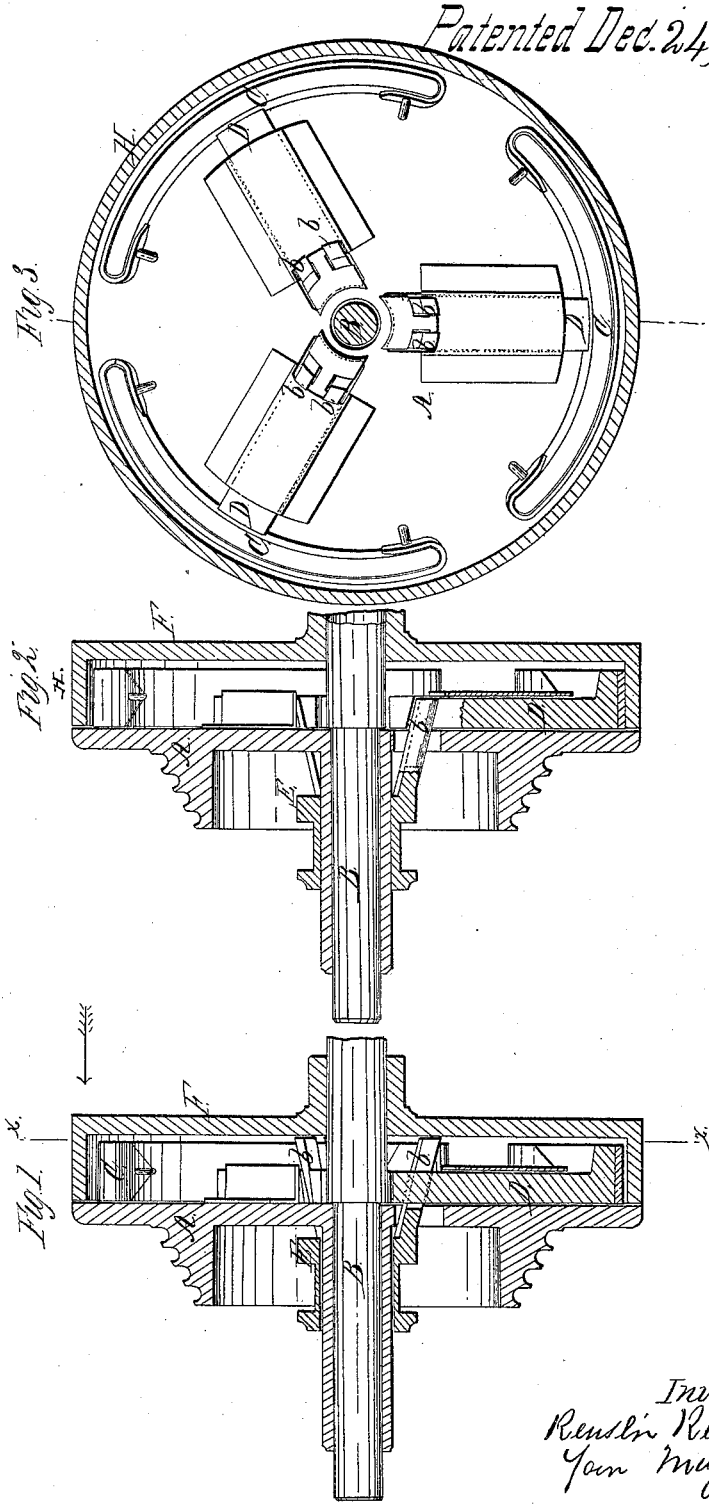

RENSSELAIR REYNOLDS, OF STOCKPORT, NEW YORK.

IMPROVEMENT IN FRICTION-CLUTCHES.

Specification forming part of Letters Patent No. 34,012, dated December 24, 1861.

*To all whom it may concern:*

Be it known that I, RENSSELAIR REYNOLDS, of Stockport, in the county of Columbia and State of New York, have invented a new and useful Improvement in Self-Adjusting Centrifugal Friction-Clutches for Power-Looms and other Machinery; and I do hereby declare the following to be a full, clear, and exact description of the same, reference being had to the accompanying drawings, making a part of this specification, in which—

Figure 1 represents an axial section of a clutch disconnected. Fig. 2 represents an axial section of a clutch connected. Fig. 3 represents a cross-section of the same, taken at the line $x\,x$ of Fig. 1 and looking in the direction of the arrow.

Similar letters of reference indicate corresponding parts in the several figures.

The object of this invention is to make a clutch for connecting and disconnecting machinery which shall hold and connect by friction alone and act to form the friction-connection by centrifugal force alone, and it is designed to be an improvement on a clutch for which a patent was granted to me the 3d day of March, 1857.

This invention consists in the employment of friction-brakes which make friction against the rim or inner periphery of a pulley attached to and turning with the shaft, the said friction-brakes being connected with another wheel turning freely on the said shaft, in combination with the inclined planes of the trifurcated sleeve. By means of this arrangement and combination when the sleeve is liberated the centrifugal action due to the rotation will force the sector friction-brakes outward against the rim or inner periphery of the fast wheel and increase the friction in the ratio of the increased velocity of the rotation. It is only necessary to liberate the sleeve to effect the clutching, while in all other friction-clutches heretofore made the clutch can only make friction by the direct application of the power.

In the accompanying drawings, A represents a pulley which receives motion from the motor, and which is mounted to turn freely on and independently of the shaft B, and therefore technically termed the "loose" pulley. On the inner face of this wheel are mounted sector friction-brakes C C C, attached on the outer extremities of radial arms D, which are adapted or fitted to slide radially in suitable guides or ways on the face of the pulley. The radial arms near their inner ends are notched or cut out on either side to allow the inclined bifurcated prongs $b\,b$ of the sleeve E to slide freely therein to move the sector friction brakes to and from the center of the pulley as the sleeve is moved longitudinally in and out on the hub of the loose pulley, the said sleeve having the usual concentric groove to receive the fork of a shipper-lever of the usual kind.

By the side of the loose pulley there is another pulley F, secured on and turning with the shaft, technically termed a "fast" pulley. The periphery of the flange or rim H of this pulley is cylindrical and extends over the sector friction-brakes, with the outer surface of which the inner periphery of the rim is coincident.

When the loose wheel is in motion, the moment the sleeve is liberated by letting go the shipper-lever the centrifugal action of the sector-brakes forces them outward until their outward surfaces bear against the inner periphery of the rim of the fast pulley and make friction thereon, thereby clutching it, so that motion is imparted thereby to the fast pulley and shaft to impart the required motion to the machinery connected either with the fast pulley or the shaft. By moving the sleeve longitudinally on the hub of the loose pulley toward the fast pulley by the shipper-lever the inclined planes of the bifurcated prongs working through the notches in the radial arms draw the sector friction-brakes inward and liberate the fast pulley, so that it can be readily stopped or will stop of itself after expanding the force of its momentum.

I am aware that friction-clutches have been made with sector friction-brakes sliding radially to make friction against the inner periphery of a wheel or pulley; but when so made they have been connected with springs the tension of which forces them inward and away from the inner periphery of the pulley or wheel on which they are required to make friction, and when required to clutch by friction the said sectors are required to be forced outward by the sliding of a thimble which acts on the said friction-brakes by brace-rods interposed, it being necessary to overcome the tension of the said springs by force applied to the thimble before the brakes can make friction on the pulley or wheel to be clutched, and besides such friction-brakes have been attached to the shaft or wheel required to be set in motion by the clutching, so that the friction-brakes could not be forced outward by centrifugal force to effect the clutching.

I do not wish to be understood as making claim to the use of radially-sliding friction-brakes for the purpose of clutching, as they have been used before for the same purpose and were described in a patent granted to me on the 3d day of March, 1857.

What I do claim as new and of my invention herein, and desire to secure by Letters Patent, is—

Connecting the longitudinally-sliding sleeve with the radial arms of the sector friction-brakes, so that when the same is liberated the centrifugal force generated by the rotation of the brakes before the clutching takes place will force the friction-brakes outward against the inner periphery of the fast pulley and thereby clutch the same, and by moving the sleeve longitudinally on the hub of the loose pulley in one direction shall by means of the inclined planes cause the sector friction-brakes to move away from and break contact with the inner periphery of the fast pulley, thus unclutching or disconnecting the pulleys by inclined planes and clutching the same wholly by centrifugal force, substantially as described.

RENSSELAIR REYNOLDS.

Witnesses:
J. E. KENT, Jr.,
V. G. ROGERS.